United States Patent [19]
Guzik et al.

[11] Patent Number: 5,751,851
[45] Date of Patent: May 12, 1998

[54] METHOD OF SPLITTING HANDWRITTEN INPUT

[75] Inventors: Kenneth J. Guzik, Santa Clara; John L. C. Seybold, Portola Valley, both of Calif.

[73] Assignee: Motorola, Inc., Schaumburg, Ill.

[21] Appl. No.: 682,480

[22] Filed: Jul. 17, 1996

Related U.S. Application Data

[63] Continuation of Ser. No. 340,084, Nov. 14, 1994, abandoned.

[51] Int. Cl.⁶ .............. G06K 9/34; G06K 9/00; G06K 9/46; G06K 9/03
[52] U.S. Cl. .............. 382/179; 382/189; 382/202; 382/310
[58] Field of Search .............. 382/177, 178, 382/179, 186, 187, 188, 189, 197, 202, 309, 310, 311

[56] References Cited

U.S. PATENT DOCUMENTS

| | | | |
|---|---|---|---|
| 4,206,442 | 6/1980 | Miyazaki et al. | 382/178 |
| 4,680,803 | 7/1987 | Dilella | 382/140 |
| 4,680,804 | 7/1987 | Kazunuki et al. | 382/13 |
| 4,727,588 | 2/1988 | Fox et al. | 382/177 |
| 4,811,412 | 3/1989 | Katsurada | 382/179 |
| 4,847,912 | 7/1989 | Tanaka et al. | 382/177 |
| 4,850,025 | 7/1989 | Abe | 382/177 |
| 4,887,227 | 12/1989 | Tsujioka et al. | 382/177 |
| 4,953,225 | 8/1990 | Togawa et al. | 382/179 |
| 4,972,496 | 11/1990 | Sklarew et al. | 382/202 |
| 5,003,614 | 3/1991 | Tanaka et al. | 382/171 |
| 5,033,097 | 7/1991 | Nakamura | 382/177 |
| 5,142,589 | 8/1992 | Lougheed et al. | 382/177 |
| 5,544,259 | 8/1996 | McCubbrey | 382/177 |
| 5,581,633 | 12/1996 | Hotta et al. | 382/177 |
| 5,600,735 | 2/1997 | Seybold | 382/178 |

*Primary Examiner*—Leo Boudreau
*Assistant Examiner*—Bipin Shalwala
*Attorney, Agent, or Firm*—J. Ray Wood

[57] ABSTRACT

The present invention provides a user with the option of editing handwritten input such that the user may elect to split one or more continues segments, or blocks of ink, to form one or more discrete continues segments. The split discrete segments are then presented as individual discrete continuous segments and analyzed as individual discrete segments by the method of machine recognition of handwritten input being employed by a device that functions to receive handwritten input.

22 Claims, 3 Drawing Sheets

METHOD OF SPLITTING HANDWRITTEN INPUT

This is a continuation of application Ser. No. 08/340,084, filed Nov. 14, 1994 and now abandoned.

The present invention is related in part to an earlier filed application, titled the Method of Recognizing Handwritten Input, Ser. No. 08/240,405, filed on May 10, 1994, herein incorporated by reference.

FIELD OF THE INVENTION

This invention relates generally to handwriting recognition, and more particularly to the selection input and editing of discrete continuous segments of handwritten input.

BACKGROUND OF THE INVENTION

Machine recognition of human handwriting is a very difficult problem, and with the recent explosion of pen-based computing devices, has become an important problem to be addressed. Machine recognition of human handwriting has various present applications.

One example of the current application for machine recognition of human handwriting is found in personal digital assistants, such as the Newton™ product and other types of pen based computing devices. Typically these type of products have a touch sensitive screen upon which a user can impose handwriting. These devices then function to digitize the handwritten input, such as alphanumeric input, and thereafter process the input in an attempt to recognize the information content of the handwriting.

Pursuant to one prior art handwriting recognition technique, one makes a best determination as to the identity of each alphanumeric character in sequence, with the resulting string of characters comprising the result of the recognition activity. There are a variety of drawbacks to this approach. It is hindered by the difficulty of identifying spatial boundaries of the candidate inputs (in this case alphanumeric characters to be recognized. When these boundaries are not located correctly, it is impossible to recognize the character accurately, since it will either be lacking pieces or will incorporate extraneous material from adjacent characters.

One significant problem with machine recognition of human handwriting is the ability to recognize the end of one input and the beginning of the next input. For example, a significant problem exists in locating the end of one handwritten input segment, word, or alphanumeric input, from the beginning of the subsequent handwritten input segment, word, or alphanumeric input. Poor recognition of the handwritten input results in poor, inaccurate interpretation of the information content of the handwritten input. This problem is accented by poor input practices of the user or input device, such as poor penmanship or handwriting habits. Machine recognition of handwritten input may incorrectly join one or more segments of handwritten input into one segment, and recognize them as a singular discrete segment. Alternatively, a user may feel the need to split one or more handwritten input segments after such segments have been entered as a singular discrete handwritten input segment.

Accordingly, a need exists for a handwriting recognition technique that allows a user or input device to enter a selection input edit instruction that permits the user, or input device, to split one or more continuous segments to form one or more discrete continuous segments for recognition and display and thereby provide a more accurate interpretation of the information content of the handwritten input.

DETAILED DESCRIPTION OF THE PREFERRED EMBODIMENTS

Figure 1:
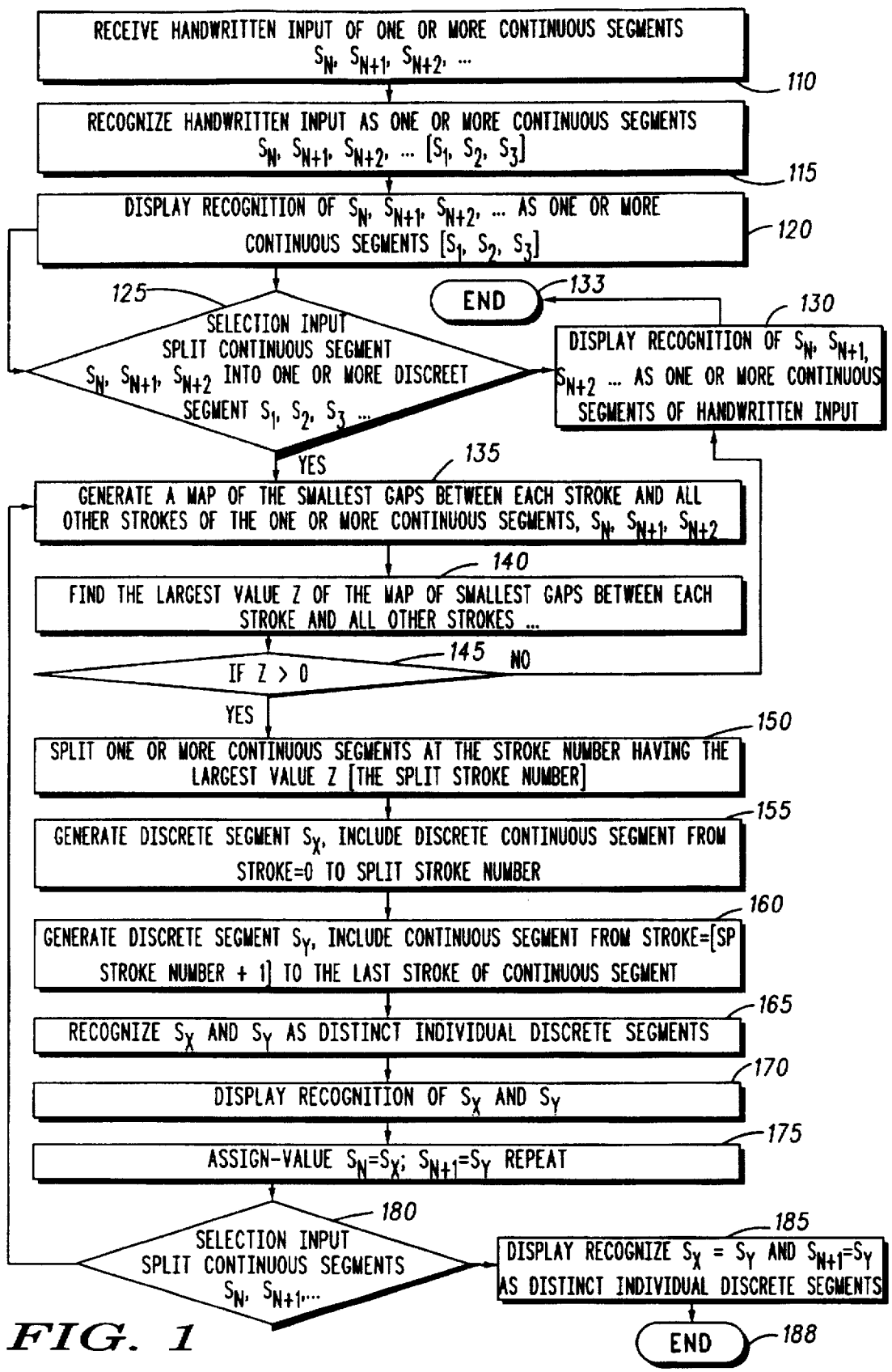
FIG. 1 illustrates a flow diagram of operation in accordance with a preferred embodiment of the present invention.

Generally, the present invention as disclosed provides a user with the option of editing handwritten input such that the user may elect to split one or more continuous segments, or blocks of ink, to form one or more discrete continuous segments. The split discrete segments are then presented as individual discrete continuous segments and analyzed as individual discrete segments by the method of machine recognition of handwritten input being employed by a device that functions to receive handwritten input, such as a Personal Digital Assistant (PDA). The recognition of the individual discrete segments that result is then displayed to the user.

In a preferred embodiment of the present invention the handwritten input is alphanumeric, the writing axis is horizontal, and the writing direction is left to right. In accordance with this preferred embodiment, the handwritten input and the resultant recognition are displayed concurrently and in close juxtaposition to each other. This close juxtaposition allows the user to refer to their original handwritten input when correcting errors in the processing and recognition of the handwritten input.

Typically, handwritten character input is collected from the user in the form of discrete continuous segments. A discrete continuous segment consists of one or more pen strokes, where a pen stroke is the mark left by a pen during its period of contact with an input device such as a digitizing tablet or paper. A stroke is represented as a sequence of points sampled at approximately regular intervals by the input device. Each point is described at minimum by an X coordinate and a Y coordinate. Strokes may be captured electronically using a digitizing tablet, or in alternative embodiments may be derived from a scanned or faxed image through a process of line detection in the image; such methods of capturing input electronically are understood in the art.

In the present invention one or more discrete continuous segments are the units of handwritten input being recognized. Handwritten input is input which is captured electronically that includes but is not limited to the following: handwritten input; electronic input; input captured through pressure, such as stamped input; input that is received electronically, such as via facsimile, pager, or other device. For purposes of explanation of the present invention, handwritten input is typically presented along a writing axis in a direction which is defined as the writing direction. The writing axis is the line along which the handwritten input is added. The writing direction is the direction in which each subsequent handwritten input is added. For example, in English, handwritten input is added typically along a horizontal writing axis with each subsequent alphanumeric input following horizontally after the previous input in a writing direction that is left to right. Various other writing axis and writing direction alternatives are possible with the implementation of the teachings of the present invention.

In a preferred embodiment, the handwriting axis is horizontal and the handwritten input forms a series of words. In this preferred embodiment, the continuous discrete segments are entered horizontally from left to right along the writing axis where each segment consists of one or more strokes where a stroke is a sequence of points. In an alternative preferred embodiment, the handwriting axis is horizontal and the handwritten input forms a series of separate characters, which may be alphanumeric characters, ideographic characters as found in languages such as Chinese, or other forms of characters or symbols of written communications. In this alternative embodiment, the output tells whether the discrete continuos segments belong to separate characters. In another preferred embodiment, the handwriting axis is vertical and the handwritten input forms a series of separate characters, which may be alphanumeric characters, ideographic characters, or other handwritten input. In this preferred embodiment, the writing axis is vertical and the output tells whether the discrete continuous segments belong to separate characters. In another preferred embodiment, the handwriting axis is vertical and the handwritten input forms a series of separate words, alphanumeric input, or other handwritten input, such as a vertical list of words, or numbers. In this preferred embodiment, the writing axis is vertical and the output tells whether the discrete continuous segments belong to separate handwritten input, such as separate words.

As disclosed above and as will be discussed further, the present invention demonstrates through the disclosure of several of the preferred embodiments that the writing axis may exist at any angle and the handwritten input may be interpreted more generally as corresponding to discrete elements (including but not limited to characters and words) containing one or more discrete continuous segments. The application of the methods described herein to any of various preferred embodiments requires only a change in the coordinate system used and such modifications can be made in accordance with the teachings presented.

Referring now to the Figures, a personal digital assistant (PDA) is generally depicted by reference numeral 100. The PDA 100 depicted constitutes a generic representation and may be comprised for example of a Newton™ or other pen based computing device. Such devices typically include a housing and a touch screen upon which input, such as words, can be handwritten using an appropriate hand manipulated stylus, or other input device. Such PDA and pen based computing devices typically include one or more microprocessors or other digital processing devices. These devices comprise computational platforms that can be readily programmed in accordance with the teachings presented herein. It should be understood that, while such personal digital assistants and pen based computing devices comprise a ready platform to accommodate the practice of applicant's teachings, the teachings presented herein may be practiced in a variety of other operating environments as well. Some examples of such environments include computers with digitizing screens, or which are connected to a digitizing input surface, or capable of receiving faxed or scanned image input, or digital or interactive televisions, modems, pagers, or other systems with the ability to capture handwritten input and process it.

Referring now to FIG. 1, a preferred method of the present invention is illustrated. The present invention is applicable to one or more handwritten inputs of continuous segments. The preferred embodiments of the present invention are applicable to handwritten inputs having two or more strokes in a continuous segment. The use of three continuous segments $S_1$, $S_2$, and $S_3$ of alphanumeric input are for illustrative purposes only. For illustrative purposes $S_1$, $S_2$, and $S_3$ represent $S_n$, $S_{n+1}$, and $S_{n+2}$ respectively. In the preferred method illustrated in FIGS. 1 through 7, handwritten input consisting of one or more continuous segments is received by an input device 110, such as a personal digital assistant 100, or other device capable of capturing handwritten input. The handwritten input is analyzed by the handwriting recognition method executing on the input device , to provide recognition 115, in this embodiment alphanumeric, that represents the corresponding handwritten input. In accordance with this preferred embodiment, the recognition of the continuous segments $S_1$, $S_2$, and $S_3$ is displayed to the user 120. Preferably, the recognition of $S_1$, $S_2$, and $S_3$ is displayed in close juxtaposition to a digitized representation of the original handwritten input of $S_1$, $S_2$, and $S_3$. Once the recognition is displayed 120, the user may select to input, or edit, 125 the displayed recognition 120 of $S_1$, $S_2$, and $S_3$. If the user, or input device, does not enter a selection input a recognition is displayed 130 for the one or more continuous segments $S_1$, $S_2$, and $S_3$ of handwritten input. If, however, the selection input is a split command, or instruction, then the continuous segments $S_1$, $S_2$, and $S_3$ along the writing axis are analyzed according to the strokes in each segment and are split into one or more discrete segments dependent if the stroke analysis indicates a gap exists among or between the continuous segments $S_1$, $S_2$, and $S_3$. Preferably, upon the receipt of a split instruction the contiguous segments $S_1$, $S_2$, and $S_3$ are parsed according to the strokes T in each segment $S_1$, $S_2$, and $S_3$ (see FIGS. 2–7). Preferably the strokes are enumerated in temporal order, i.e. the order in which the user enters them; or input device receives them. This order is not necessarily the order that they appear along the writing axis. For example if the writing axis is left to right in the x direction, a stroke $T_n$ which is written first may appear after a stroke $T_{n+1}$. For example the upward stroke of the cursive letter "i" may be stroke $T_n$, but the stroke of the "dot" of the "i", which is $T_{n+1}$ may appear on a the writing axis before the stroke $T_n$.

In the preferred embodiment of the present invention, once the continuous segments $S_1$, $S_2$, and $S_3$ are parsed into their respective strokes, a map 135 of the smallest gap $W_i$ that exist between each stroke i and all subsequent strokes is generated and recorded. For each stroke i a value $W_i$ is recorded on the map 135, which is the size of the smallest gap found between that stroke and all subsequently written strokes. Next (step 140, FIG. 1) these values are processed to find the largest value Z which is the largest of the smallest gap values. As illustrated in FIG. 1, 140, the value Z (in this case Z=10) is recorded because it is the largest value found of those values corresponding to the smallest gaps that exist between a particular stroke $T_n$ and all other subsequent $T_{n+1}$ . . . , of the continuous segments $S_1$, $S_2$, and $S_3$. Graphic illustrations of the value of Z are shown in FIGS. 2–7. If the value of Z is less than or equal to zero the contiguous segments $S_1$, $S_2$, and $S_3$ are concluded to be a single continuous handwritten input and is displayed to the user, or input device, as such 130. However, if the value of Z, for any stroke T, is greater than zero, the one or more continuous segments $S_1$, $S_2$, and $S_3$, are split (step 150) at the stroke number $T_x$ having the largest value of the minimum gap $W_i$ which is 2; where $T_x$ is defined as the split stroke number. If a split stroke number is found, at least one discrete segment $S_x$ is generated 155, where $S_x$ includes the discrete continuous segments from stroke T=Zero to the split stroke number $T_x$. At least a second discrete segment $S_y$ is generated 160, where $S_y$ includes the discrete continuous segments from split stroke number plus one, $T_{x+1}$, to the last stroke $T_{end}$ of the continuous segments $S_1$, $S_2$, and $S_3$. In accordance with the preferred embodiment of the present invention, the discrete continuous segments $S_x$ and $S_y$ are each analyzed and recognized as separate, distinct handwritten inputs by the handwriting recognition method executing on the input device 165. The teaching of the present invention may be employed by a variety of handwriting recognition methods. The recognition for both $S_x$ and $S_y$ is displayed to the user or input device 170. Preferably, the recognition of $S_x$ and $S_y$ is displayed in close juxtaposition to a digitized representation of the original handwritten input of continuous segments $S_1$, $S_2$, and $S_3$, or a to a digitized representation of the handwritten input divided according to the discrete segments $S_x$ and $S_y$. Once the recognition of $S_x$ and $S_y$ is displayed 170, the user, or input device, may repeat a selection input split instruction and may select to split the discrete segments $S_x$ and $S_y$, if possible. In accordance with the preferred method of the present invention a user may continue with one or more selection input instructions until the user no longer selects a split instruction or there are no discrete continuos segments remaining to split.

Figure 2:
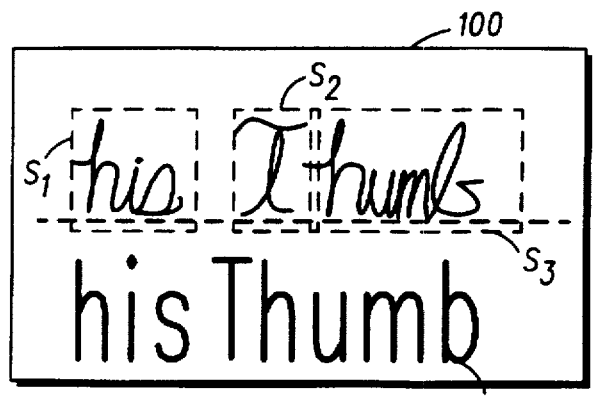
FIG. 2 illustrates a graphical view of an illustrative display in accordance with a preferred embodiment of the present invention.
Figure 3:
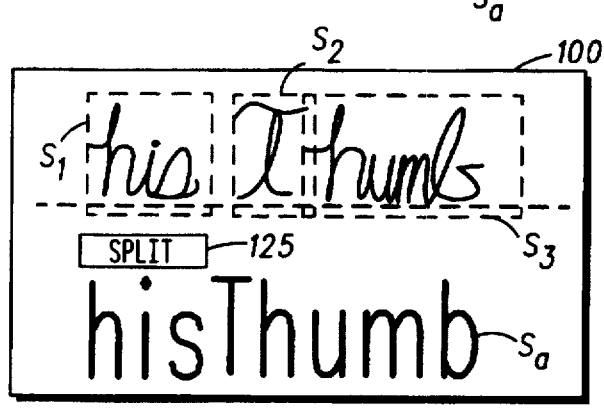
FIG. 3 illustrates a graphical view of an illustrative display in accordance with a preferred embodiment of the present invention.
Figure 4:
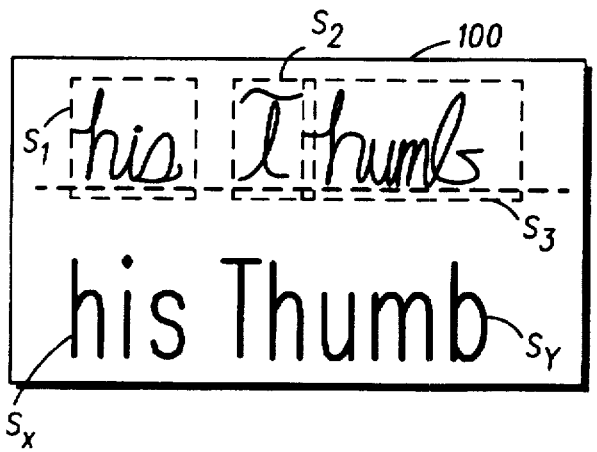
FIG. 4 illustrates a graphical view of an illustrative display in accordance with a preferred embodiment of the present invention.

Referring now to FIGS. 2 through 7, a graphical representation of a preferred embodiment of the present invention is illustrated. FIGS. 2 through 4, illustrate an input device 110 upon which is received the handwritten input consisting of continuous segments $S_1$, $S_2$, and $S_3$. The continuous segments are recognized as a single continuous segment $S_a$ and are displayed to the user or input device as such. In accordance with a preferred embodiment of the present invention a selection input is requested by the user, or input device. The selection input 125 is a split instruction, as illustrated in FIGS. 1 and 3. FIG. 4 illustrates the recognition and display of the discrete continuous segments $S_x$ and $S_y$ after the continuous segments $S_1$, $S_2$, and $S_3$ were parsed into strokes and processed according to a preferred method substantially similar to the method illustrated in FIG. 1. The advantage of the present invention allows a user, or input device to split an infinite amount of continuous segments $S_n$, $S_{n+1}$, $S_{n+2}$, etc., either repeatedly or simultaneously, to form separate individual discrete segments $S_x$, $S_y$, etc. This provides a user, or input device, a variety of editing capabilities.

Figure 5:
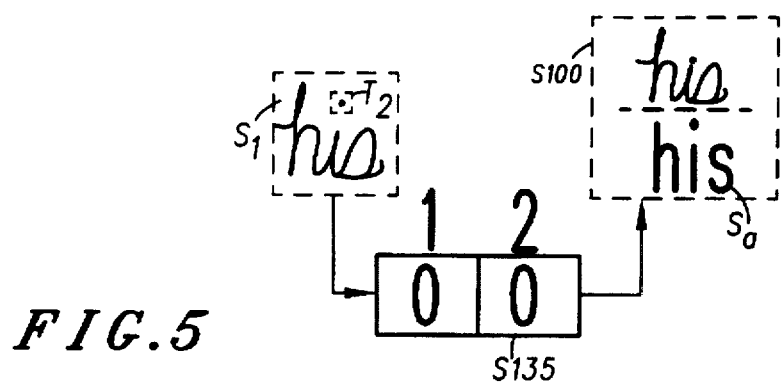
FIG. 5 illustrates a graphical view of an illustrative display in accordance with a preferred embodiment of the present invention.
Figure 6:
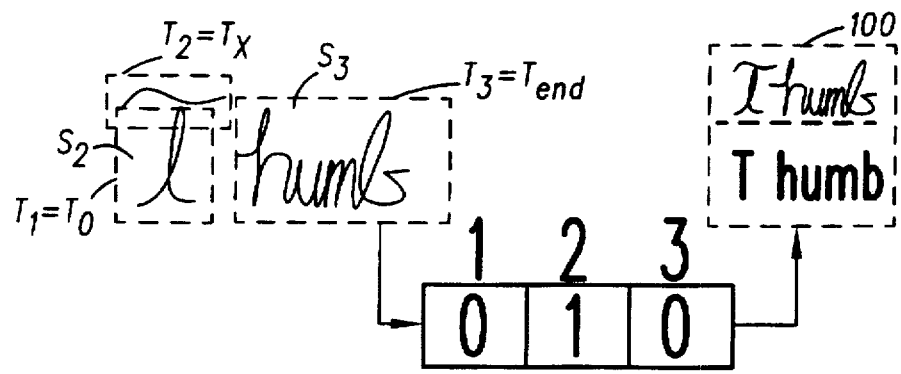
FIG. 6 illustrates a graphical view of an illustrative display in accordance with a preferred embodiment of the present invention.
Figure 7:
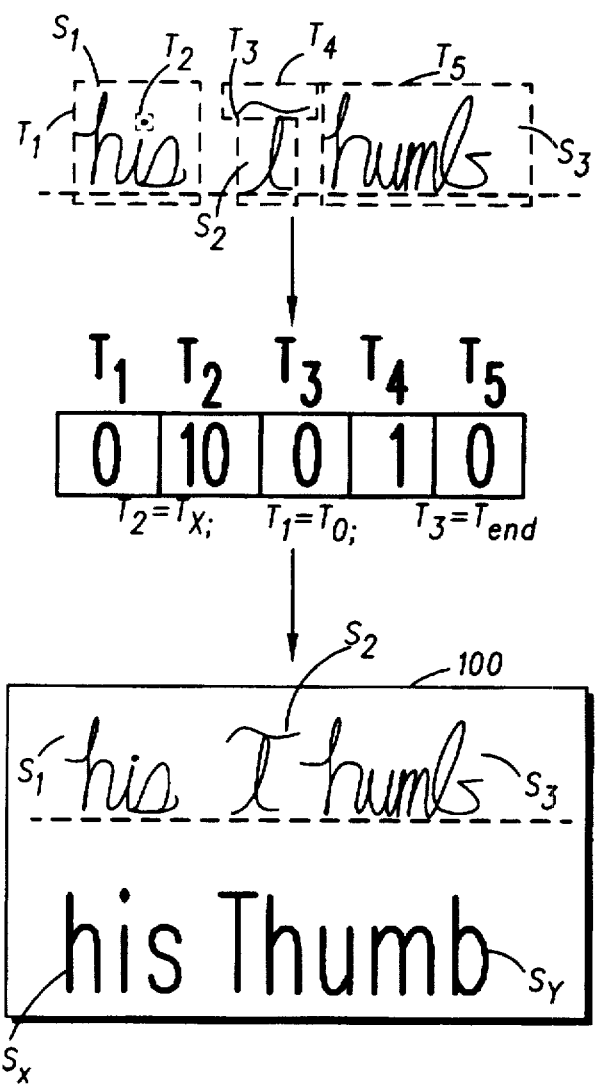
FIG. 7 illustrates a graphical view of an illustrative display in accordance with a preferred embodiment of the present invention.

FIGS. 5 through 7, illustrate a preferred method substantially similar to the method illustrated in FIG. 1, as steps 125 through 188. In this preferred embodiment, the continuous segments $S_1$, $S_2$, and $S_3$ are parsed into strokes $T_0$ through $T_{end}$. A map of the smallest gaps between each stroke and all subsequent strokes of the continuous segments $S_1$, $S_2$, and $S_3$, is generated 135. From this map the largest value, Z, 140, is recorded from the map of values of the smallest gaps found between that stroke and all subsequent strokes. If map generated indicates Z is less than or equal to zero the continuous segment is found to be a single discrete handwritten input. This is illustrated in FIG. 5, the continuous segment $S_1$ is deemed to be a single discrete handwritten input, in this example a single word that should not be split.

As illustrated in FIG. 6–7, if however the value of Z is greater than zero for any of the strokes T, the one or more continuous segments $S_1$, $S_2$, and $S_3$, are split at the stroke number $T_x$ having the largest value Z 150; where $T_x$ is defined as the split stroke number. If a split stroke number is found, at least one discrete segment $S_x$ is selectively generated 155, where $S_x$ includes the discrete continuous segments from stroke T=Zero to the split stroke number $T_x$. At least a second discrete segment $S_y$ is generated 160, where $S_y$ includes the discrete continuous segments from split stroke number plus one, $T_{x+1}$, to the last stroke $T_{end}$ of the continuous segments $S_1$, $S_2$, and $S_3$. In accordance with the preferred embodiment of the present invention, the discrete continuous segments $S_x$ and $S_y$ are each analyzed and recognized as separate, distinct handwritten inputs by the handwriting recognition method executing on the input device 165. The recognition for both $S_x$ and $S_y$ is displayed to the user or input device 170.

It will be apparent to those skilled in the art that the disclosed invention may be modified in numerous ways and may assume many embodiments other than the preferred forms particularly set out and described above. Accordingly, it is intended by the appended claims to cover all modifications of the invention that fall within the true spirit and scope of the invention and its equivalents.

What is claimed is:

1. A method comprising the steps of:

processing electronic data comprising a series of data points that correspond to an original handwritten input of continuous segments to provide recognized characters that correspond to the original handwritten input;

displaying the recognized words;

upon receiving a split instruction, parsing the series of data points into a series of strokes from a given stroke and each subsequently written stroke, generating a first set of gap values for the given stroke of the gap or gaps between the given stroke as compared to each subsequently written stroke, continuing generating further first sets of one or more gap values of the gap or gaps between each stroke as compared to every other subsequently written stroke:

from the first sets of gap values so generated, generating a second set of smallest gap values comprising a smallest of the gap values for each stroke;

splitting the one or more continuous segments at a split stroke number $T_x$, said split stroke number having a largest value of the second set of smallest gap values;

generating at least a first discrete continuous segment incorporating each of the series of strokes from a start stroke $T_0$ to the split stroke number $T_x$;

generating at least a second discrete continuous segment incorporating each of the series of strokes from a stroke immediately following the split stroke number $T_x$ to a final stroke; and displaying recognized words that correspond to the first and second discrete continuous segments.

2. A method comprising the steps of:

processing data representing handwritten input having one or more continuous segments and displaying recognized characters representing said handwritten input;

parsing, upon command, the segments into a series of strokes;

from a given stroke and each subsequently written stroke, generating a first set of gap values for the given stroke of the gap or gaps between the given stroke as compared to each subsequently written stroke;

generating further first sets of one or more gap values for further strokes;

generating, from the first sets of gap values a smallest gap value for each stroke to provide a second set of smallest gap values comprising a smallest of the gap values for each stroke of the series of strokes;

splitting the one or more continuous segments between a stroke $T_x$ and an immediate following stroke $T_{x+1}$ having a largest value of the second set of smallest gap values therebetween, to provide first and second discrete continuous segments; and displaying recognized characters that represent the first and second discrete continuous segments.

3. A method, comprising the steps of:

processing data representing one or more continuous segments of handwritten input and displaying recognized characters associated therewith;

parsing, upon command, the segments into a series of strokes; comparing a gap value for a size of a gap from each stroke to each remaining stroke in the series of strokes to provide, for each stroke, a first set of gap values;

from first sets of gap values so provided, identifying a smallest gap value for each stroke, thereby providing a second set of smallest gap values;

identifying a largest gap value of the second set of smallest gap values of the series of strokes;

splitting the one or more continuous segments at the largest gap value to provide first and second discrete continuous segments; and displaying recognized characters associated with the first and second discrete continuous segments.

4. The method of claim 3, wherein the processing step further comprises:

generating the data from the one or more continuous segments of handwritten input entered by a user along a writing axis in a writing direction; and processing the data for displaying the recognized characters associated therewith.

5. The method of claim 3, wherein the processing step further comprises:

generating the data from the one or more continuous segments of handwritten input entered by a user along an a horizontal writing axis in a left-to-right writing direction; and processing the data for displaying the recognized words or characters associated therewith.

6. The method of claim 3, wherein the processing step further comprises:

generating the data from the one or more continuous segments of handwritten input entered by a user along an a vertical writing axis in a predetermined writing direction; and processing the data for displaying the recognized words or characters associated therewith.

7. The method of claim 3, wherein the processing step further comprises processing the data representing the one or more continuous segments of handwritten input and displaying the recognized characters associated therewith in juxtaposition to the handwritten input.

8. The method of claim 3, wherein the displaying step further comprises displaying the recognized characters associated with the first and second discrete continuous segments in juxtaposition to the handwritten input.

9. The method of claim 3, wherein the parsing step further comprises parsing, upon command, the segments into a series of enumerated strokes enumerated in entered or received order, and generating a smallest gap value for each enumerated stroke as compared to each remaining enumerated strokes in the series of enumerated strokes to provide the largest value from the set of smallest gap values between the series of enumerated strokes.

10. The method of claim 3, wherein the splitting step further comprises splitting the one or more continuous segments at the largest value of the smallest gap values to provide the first and second discrete continuous segments when the largest gap value is greater than zero.

11. The method of claim 3, wherein the splitting step further comprises determining that the one or more continuous segments cannot be split when the largest value of the smallest gap values is less than or equal to zero.

12. A device, comprising:

digital processing circuitry capable of processing data representing one or more continuous segments of handwritten input and capable of parsing, upon command, the segments into a series of strokes and comparing a gap value for each stroke to each subsequent stroke in the series of strokes for generating a first set of gap values for each stroke, for identifying a smallest gap value for each stroke from the first set of cap values for each stroke, thereby providing a second set of smallest gap values for the series of strokes and for splitting the one or more continuous segments at a largest value of the second set of smallest gap values of the series of strokes to provide first and second discrete continuous segments; and a display for displaying recognized characters associated with the handwritten input and the first and second discrete continuous segments.

13. The device of claim 12, which includes a hand manipulates stylus facilitating user entry of the handwritten input.

14. The device of claim 12, which includes a digitizing screen for the display or digitizing tablet upon which a user can enter the handwritten input.

15. The device of claim 14, wherein the digital processing circuitry is programmed to generate the data from the one or more continuous segments of handwritten input entered by a user along an a writing axis in a predetermined writing direction on the digitizing screen for the display or the digitizing tablet.

16. The device of claim 14, wherein the digital processing circuitry is programmed to generate the data from the one or more continuous segments of handwritten input entered by a user along an a horizontal writing axis in a left-to-right writing direction on the digitizing screen for the display or the digitizing tablet.

17. The device of claim 14, wherein the digital processing circuitry is programmed to generate the data from the one or more continuous segments of handwritten input entered by a user along an a vertical writing axis in a predetermined writing direction on the digitizing screen for the display or the digitizing tablet.

18. The device of claim 12, wherein the digital processing circuitry and the display operate to display the recognized words or characters associated therewith in juxtaposition to the handwritten input.

19. The device of claim 12, wherein the digital processing circuitry and the display operate to display the recognized words or characters associated with the first and second discrete continuous segments in juxtaposition to the handwritten input.

20. The device of claim 12, wherein the digital processing circuitry is programmed to parse, upon command, the segments into a series of enumerated strokes enumerated in entered or received order, and comparing the gap value for each enumerated stroke to the remaining enumerated strokes in the series of enumerated strokes to provide the largest value from the second set of smallest gap values between the series of enumerated strokes.

21. The device of claim 12, wherein the digital processing circuitry is programmed to split the one or more continuous segments at the largest gap value to provide the first and second discrete continuous segments when the largest gap value is greater than zero.

22. The device of claim 12, wherein the digital processing circuitry is programmed to determine that the one or more continuous segments cannot be split when the largest gap value is less than or equal to zero.

* * * * *

UNITED STATES PATENT AND TRADEMARK OFFICE
CERTIFICATE OF CORRECTION

PATENT NO. : 5,751,851
DATED : May 12, 1998
INVENTOR(S) : Guzik et al.

It is certified that error appears in the above-indentified patent and that said Letters Patent is hereby corrected as shown below:

Column 8 Line 30 reads "cap" should be "gap"

Signed and Sealed this

Twenty-seventh Day of October, 1998

Attest:

BRUCE LEHMAN

Attesting Officer

Commissioner of Patents and Trademarks